(12) United States Patent
Lee et al.

(10) Patent No.: US 11,390,231 B2
(45) Date of Patent: Jul. 19, 2022

(54) ROOF AIRBAG APPARATUS

(71) Applicants: HYUNDAI MOBIS CO., LTD., Seoul (KR); INALFA ROOF SYSTEMS KOREA LTD., Hwaseong-si (KR)

(72) Inventors: Dong Oh Lee, Yongin-si (KR); Byung Ho Min, Yongin-si (KR); Kwang Won Seo, Yongin-si (KR); Sang Gi Jang, Pyeongtaek-si (KR)

(73) Assignees: HYUNDAI MOBIS CO., LTD., Seoul (KR); INALFA ROOF SYSTEMS KOREA LTD., Hwaseong-si (KR)

( * ) Notice: Subject to any disclaimer, the term of this patent is extended or adjusted under 35 U.S.C. 154(b) by 0 days.

(21) Appl. No.: 17/090,687

(22) Filed: Nov. 5, 2020

(65) Prior Publication Data

US 2021/0138987 A1     May 13, 2021

(30) Foreign Application Priority Data

Nov. 7, 2019   (KR) .................. 10-2019-0141560

(51) Int. Cl.
| | |
|---|---|
| *B60R 21/08* | (2006.01) |
| *B60R 21/2334* | (2011.01) |
| *B60R 21/214* | (2011.01) |
| *B60R 21/213* | (2011.01) |
| *B60R 21/237* | (2006.01) |
| *B60R 21/16* | (2006.01) |

(52) U.S. Cl.
CPC ............ *B60R 21/08* (2013.01); *B60R 21/213* (2013.01); *B60R 21/214* (2013.01); *B60R 21/2334* (2013.01); *B60R 21/237* (2013.01); *B60R 2021/161* (2013.01)

(58) Field of Classification Search
CPC ... B60R 21/08; B60R 21/2334; B60R 21/214; B60R 21/237; B60R 2021/161; B60R 21/213; B60R 21/264; B60R 2011/0028; B60R 2011/0059; B60J 7/043
See application file for complete search history.

(56) References Cited

U.S. PATENT DOCUMENTS

| | | | |
|---|---|---|---|
| 6,189,960 B1 * | 2/2001 | Mumura ................. | B60J 7/0015 160/7 |
| 6,860,506 B2 * | 3/2005 | Ogata .................... | B60R 21/232 280/728.2 |

(Continued)

FOREIGN PATENT DOCUMENTS

| | | | |
|---|---|---|---|
| DE | 102006055037 B4 * | 10/2018 | ........... B60R 21/237 |
| DE | 202021101051 U1 * | 3/2021 | ........... B60R 21/214 |

(Continued)

OTHER PUBLICATIONS

English translation of KR 20170049651 A retrieved from espacenet on Sep. 9, 2021 (Year: 2017).*

*Primary Examiner* — Paul N Dickson
*Assistant Examiner* — Caitlin Anne Miller
(74) *Attorney, Agent, or Firm* — DLA Piper LLP (US)

(57) ABSTRACT

A roof airbag apparatus may include: a deployment guide part mounted on a sunshine roof part of a vehicle; a cushion part mounted in the sunshine roof part, and deployed in a longitudinal direction of the deployment guide part; and an inflator part mounted in the cushion part, and configured to discharge gas to the cushion part in case of a collision of the vehicle.

6 Claims, 7 Drawing Sheets

(56) References Cited

U.S. PATENT DOCUMENTS

| | | | |
|---|---|---|---|
| 9,771,048 B2* | 9/2017 | Min | B60R 21/2338 |
| 10,933,833 B2* | 3/2021 | Park | B60R 21/214 |
| 11,014,523 B2* | 5/2021 | Min | B60R 21/2176 |
| 2019/0366968 A1* | 12/2019 | Park | B60R 21/214 |
| 2020/0139918 A1* | 5/2020 | Koo | B60R 21/231 |
| 2021/0179003 A1* | 6/2021 | Min | B60R 21/2334 |
| 2021/0179004 A1* | 6/2021 | Lee | B60R 21/2334 |
| 2021/0276507 A1* | 9/2021 | Min | B60R 21/214 |

FOREIGN PATENT DOCUMENTS

| | | | |
|---|---|---|---|
| KR | 20170049651 A | * | 5/2017 |
| KR | 20210077218 A | * | 6/2021 |

* cited by examiner

ROOF AIRBAG APPARATUS

CROSS-REFERENCE TO RELATED APPLICATION

This application claims priority from and the benefit of Korean Patent Application No. 10-2019-0141560, filed on Nov. 7, 2019, which is hereby incorporated by reference for all purposes as if set forth herein.

BACKGROUND

Field

Exemplary embodiments of the present disclosure relate to a roof airbag apparatus, and more particularly, to a roof airbag apparatus which can prevent a passenger from being thrown out of a vehicle, when an accident occurs in a vehicle with a sunshine roof.

Discussion of the Background

A roof airbag apparatus includes a cushion which is mounted in a panorama roof of a vehicle, and deployed along a deployment guide at the top of a roof glass and the bottom of a screen.

In the related art, the deployment guide is positioned at front and rear ends of the roof of the vehicle. Thus, the deployment guide can maintain a protection function in a vehicle with a panorama sunshine roof, but cannot perform the protection function in a vehicle with a general sunshine roof or dual sunshine roofs.

In order to protect the entire roof having a large area with one airbag, an airbag module having a large package is needed. For this structure, the space for a sun visor and a lamp of an overhead console at the front of the vehicle is limited. Thus, an additional design change is required. Therefore, there is a need for a structure capable of solving the problem.

SUMMARY

Various embodiments are directed to a roof airbag apparatus which can prevent a passenger from being thrown out of a vehicle, when an accident occurs in a vehicle with a sunshine roof.

In an embodiment, a roof airbag apparatus may include: a deployment guide part mounted on a sunshine roof part of a vehicle; a cushion part mounted in the sunshine roof part, and deployed in a longitudinal direction of the deployment guide part; and an inflator part mounted in the cushion part, and configured to discharge gas to the cushion part in case of a collision of the vehicle.

The inflator part may include: an inflator body mounted in the cushion part, and configured to discharge gas to the cushion part; an inflator bracket having one open side, and configured to cover an end of the inflator body; and a clamp configured to close the open side of the inflator bracket, and clamp the inflator body to the inflator bracket.

The deployment guide part may be formed in a longitudinal direction of the vehicle, and guides a deployment of the cushion part while coming into contact with both ends of the cushion part.

The deployment guide part may have a length set according to a length of the sunshine roof part.

The roof airbag apparatus may further include a roller part disposed at an end of the cushion part, and rotated by contact with the cushion part which is inflated by gas discharged from the inflator part.

The cushion part may be folded in a zigzag shape and connected to the inflator part, before deployed.

The cushion part may be fixed to a module bracket part fixed to one side of the sunshine roof part.

The module bracket part may be mounted on one side of the sunshine roof part, corresponding to the opposite direction of a deployment direction of the cushion part.

The deployment guide part may be mounted according to the number of the sunshine roof parts formed in a longitudinal direction of the vehicle.

The roof airbag apparatus in accordance with the embodiment of the present disclosure can be applied to various sunshine roofs other than the panorama sunshine roof.

Furthermore, the roof airbag apparatus in accordance with the embodiment of the present disclosure can be reduced in size to not only minimize interference with surrounding other parts, but also minimize a change in layout of the roof of an existing vehicle, thereby improving the productivity.

Furthermore, the size of the cushion part can be reduced to improve the deployment speed of the airbag apparatus, which makes it possible to effectively protect a passenger.

DETAILED DESCRIPTION OF THE ILLUSTRATED EMBODIMENTS

Hereinafter, a roof airbag apparatus will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
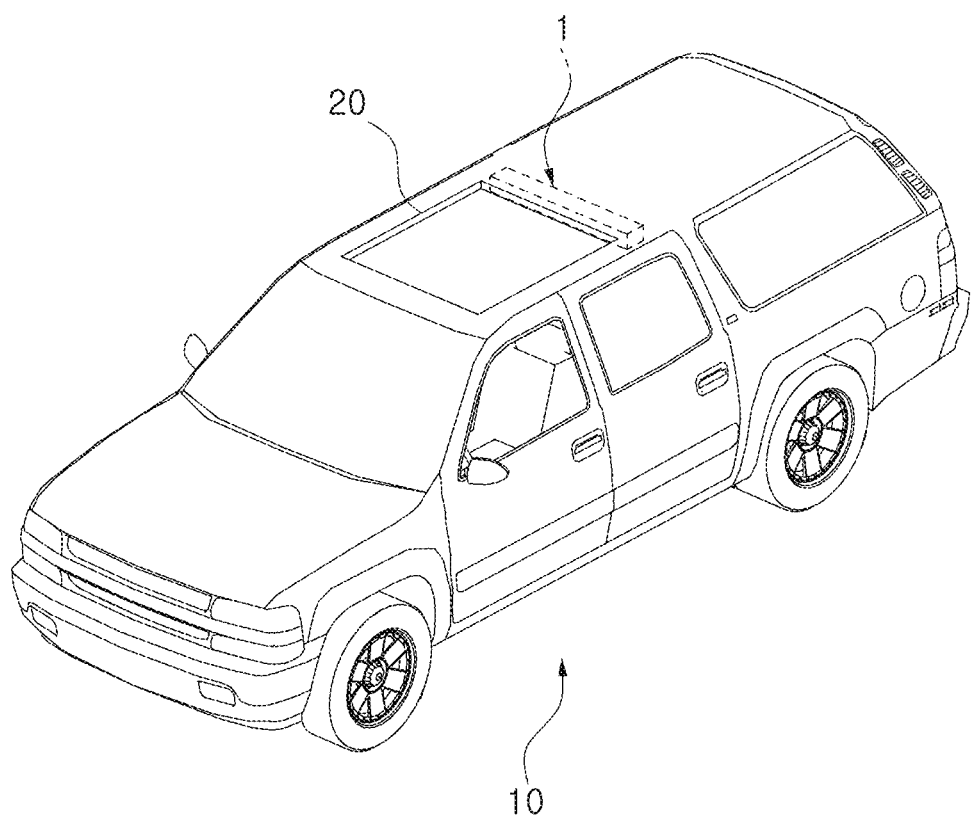
FIG. 1 is a perspective view schematically illustrating a vehicle in which a roof airbag apparatus in accordance with an embodiment of the present disclosure is mounted.
Figure 2:
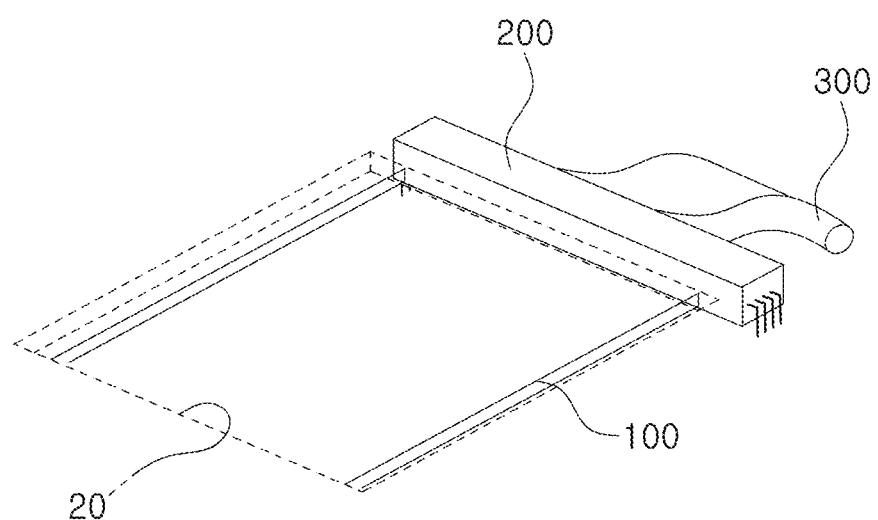
FIG. 2 is a perspective view schematically illustrating the roof airbag apparatus in accordance with the embodiment of the present disclosure.
Figure 3:
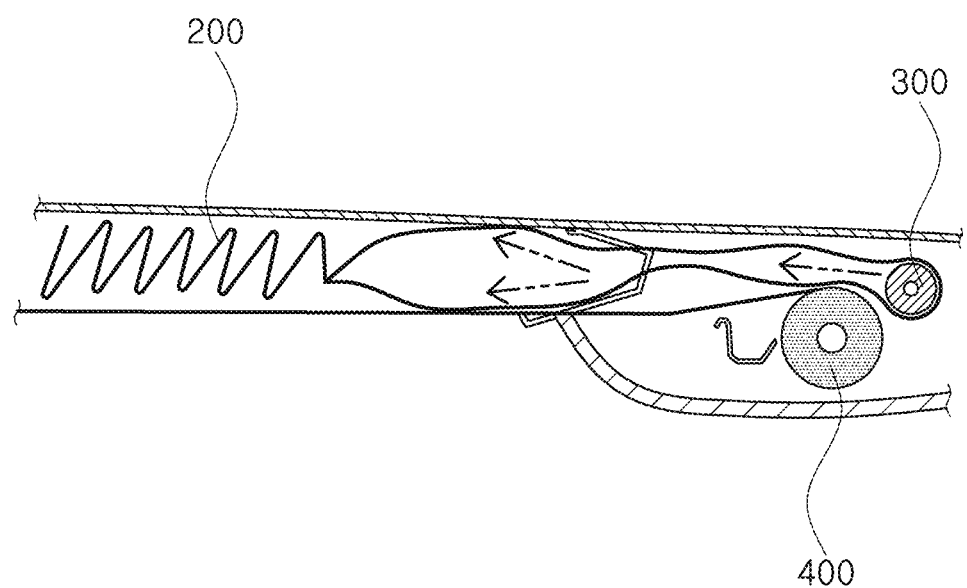
FIG. 3 is a cross-sectional view schematically illustrating the roof airbag apparatus in accordance with the embodiment of the present disclosure.
Figure 4:
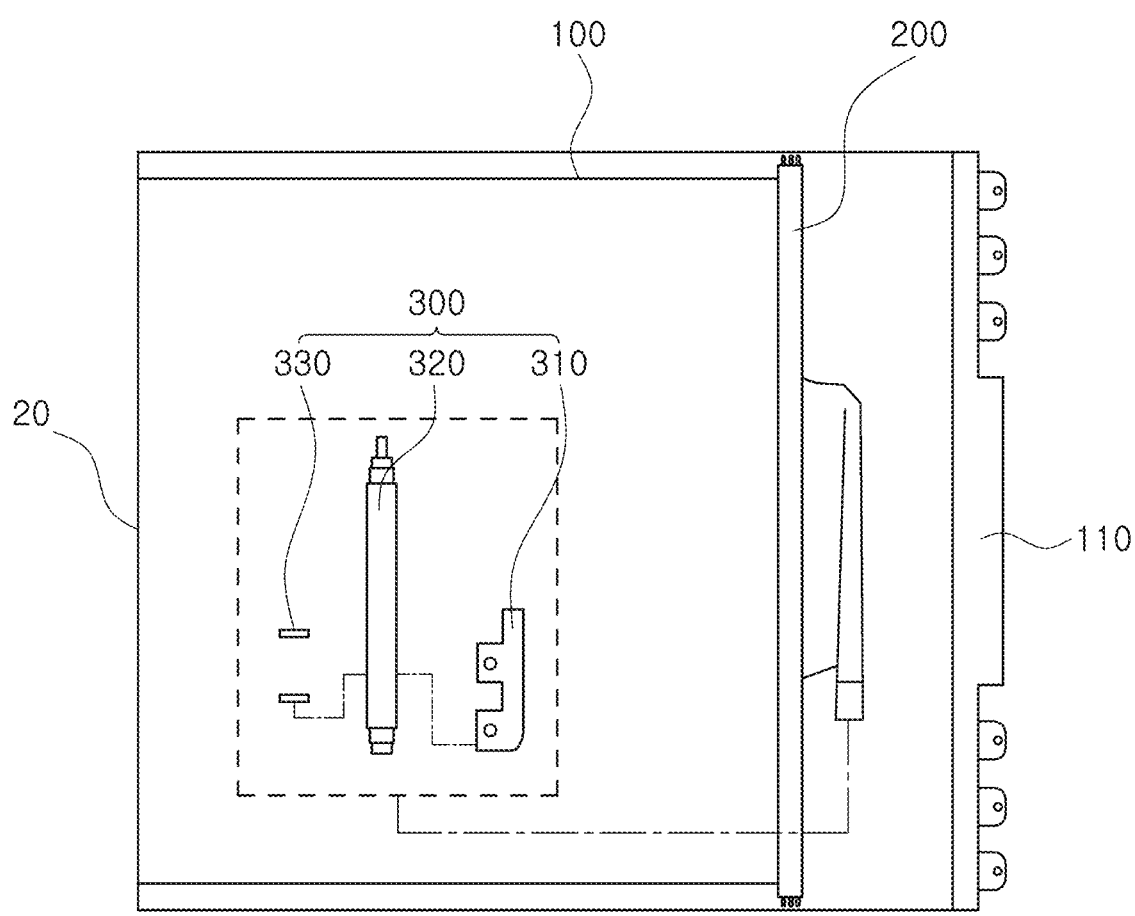
FIG. 4 is a plan view schematically illustrating the roof airbag apparatus in accordance with the embodiment of the present disclosure is assembled.
Figure 5:
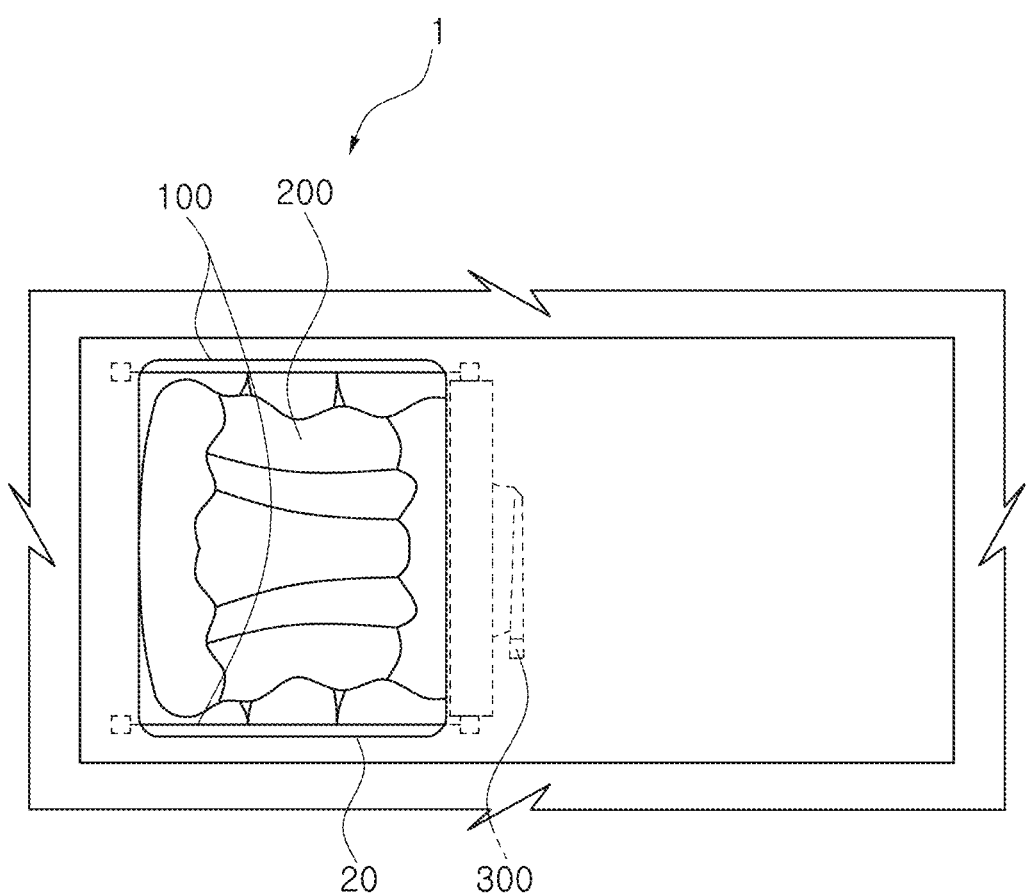
FIG. 5 is a plan view schematically illustrating that a cushion part of the roof airbag apparatus in accordance with the embodiment of the present disclosure is deployed.
Figure 6:
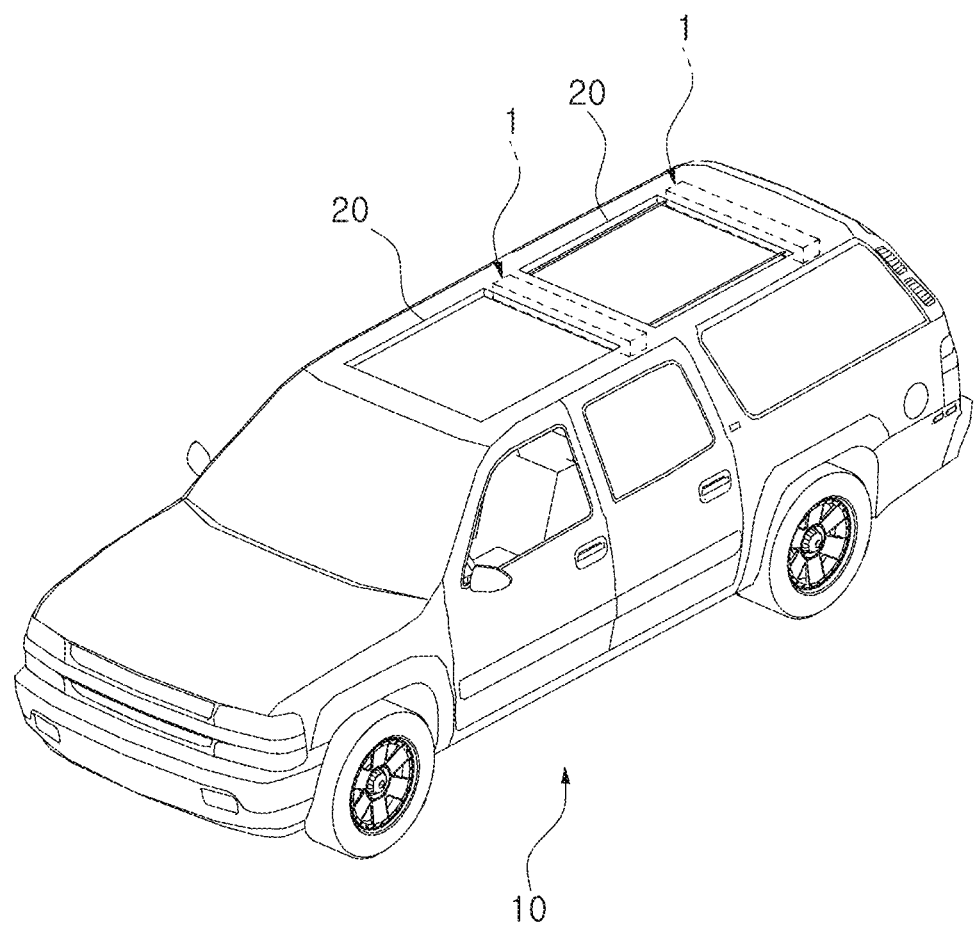
FIG. 6 is a perspective view schematically illustrating a vehicle in which a roof airbag apparatus in accordance with another embodiment of the present disclosure is mounted.
Figure 7:
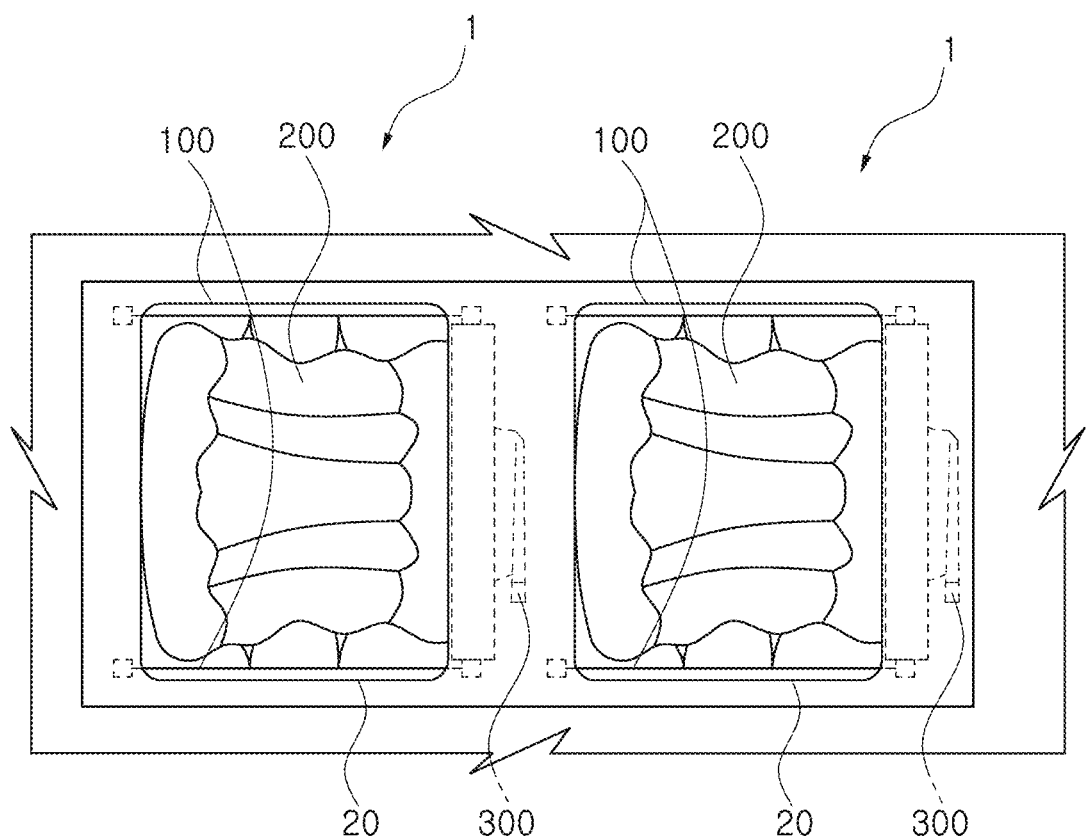
FIG. 7 is a plan view schematically illustrating that a cushion part of the roof airbag apparatus in accordance with the another embodiment of the present disclosure is deployed.

FIG. 1 is a perspective view schematically illustrating a vehicle in which a roof airbag apparatus in accordance with an embodiment of the present disclosure is mounted, FIG. 2 is a perspective view schematically illustrating the roof airbag apparatus in accordance with the embodiment of the present disclosure, FIG. 3 is a cross-sectional view schematically illustrating the roof airbag apparatus in accordance with the embodiment of the present disclosure, FIG. 4 is a plan view schematically illustrating the roof airbag apparatus in accordance with the embodiment of the present disclosure is assembled, FIG. 5 is a plan view schematically illustrating that a cushion part of the roof airbag apparatus in accordance with the embodiment of the present disclosure is deployed, FIG. 6 is a perspective view schematically illustrating a vehicle in which a roof airbag apparatus in accordance with another embodiment of the present disclosure is mounted, and FIG. 7 is a plan view schematically illustrating that a cushion part of the roof airbag apparatus in accordance with the another embodiment of the present disclosure is deployed.

Referring to FIGS. 1 to 7, a roof airbag apparatus 1 in accordance with an embodiment of the present disclosure includes a deployment guide part 100, a cushion part 200 and an inflator part 300.

The deployment guide part 100 is mounted on a sunshine roof part 20 of a vehicle 10. The sunshine roof part 20 is openably formed only at the front of the vehicle 10 (see FIG. 1) or openably formed at the front and rear of the roof of the vehicle 10 (see FIG. 6), according to the type of the vehicle 10.

Referring to FIG. 1, the sunshine roof part 20 formed at the front of the vehicle 10 is mounted at the front of the roof of the vehicle 10. Referring to FIG. 6, the sunshine roof parts 20 formed at the front and rear of the vehicle 10 are mounted on center pillars at the front and rear of the vehicle 10.

The deployment guide part 100 is formed in the longitudinal direction of the vehicle 10, and guides the deployment of the cushion part 200 while coming into contact with the corresponding end of both ends of the cushion part 200. The cushion part 200 is deployed in the longitudinal direction of the deployment guide part 100 toward the front of the vehicle 10.

The deployment guide part 100 has a length set according to the length of the sunshine roof part 20. That is, when the sunshine roof part 20 is formed only at the front of the roof of the vehicle 10 as illustrated in FIG. 1, the deployment guide part 100 has a length corresponding to the length of the sunshine roof part 20. When the sunshine roof parts 20 are formed at the front and rear of the roof part of the vehicle 10 as illustrated in FIG. 6, the deployment guide part 100 has a length set according to the length of each of the sunshine roof parts 20.

The cushion part 200 is mounted in the sunshine roof part 20, and deployed in the longitudinal direction of the deployment guide part 100. Both ends of the cushion part 200 are deployed in the longitudinal direction of the deployment guide part 100 while coming into contact with the deployment guide part 100.

The cushion part 200 has one side connected to the inflator part 300, and is inflated by gas discharged from the inflator part 300. The cushion part 200 is folded in a zigzag shape and connected to the inflator part 300 (see FIG. 3), before deployed by the gas of the inflator part 300. The cushion part 200 folded repeatedly in a zigzag shape is deployed along the deployment guide part 100 while sequentially inflated by the gas of the inflator part 300. The cushion part 200 may be folded in a zigzag shape before deployed, and thus optimally mounted in a limited space.

One side (right side in FIG. 4) of the cushion part 200 is fixed to a module bracket part 110 fixed to one side (right side in FIG. 4) of the sunshine roof part 20. Since the one side of the cushion part 200 is fixed to the module bracket part 110 fixed to the sunshine roof part 20, the cushion part 200 may be prevented from separating from the sunshine roof part 20, when inflated.

The module bracket part 110 is mounted on one side (the right side in FIG. 4) of the sunshine roof part 20, corresponding to the opposite direction of the deployment direction (the left side in FIG. 4) of the cushion part 200. The module bracket part 110 is mounted on the one side of the sunshine roof part 20, corresponding to the opposite direction of the deployment direction of the cushion part 200, and does not interfere with the deployment of the cushion part 200 while fixing the cushion part 200.

The inflator part 300 is mounted in the cushion part 200, and discharges gas to the cushion part 200 in case of a collision of the vehicle 10. Information on whether the vehicle 10 collides is sensed by a sensor (not illustrated) mounted on the vehicle 10. The collision signal of the vehicle 10, sensed by the sensor, is transferred to a controller (not illustrated), and the controller operates the inflator part 300.

The inflator part 300 includes an inflator body 320, an inflator bracket 310 and a clamp 330. The inflator body 320 is mounted in the cushion part 200, and discharges gas to the cushion part 200. In the present disclosure, one side (top side in FIG. 4) of the inflator body 320 is inserted into the cushion part 200, and the other side (bottom side in FIG. 4) of the inflator body 320 is clamped to the cushion part 200 by the inflator bracket 310 and the clamp 330.

The inflator bracket 310 has one open side (left side in FIG. 4), and covers an end of the inflator body 320. The inflator body 320 is inserted into the open side of the inflator bracket 310, and the inflator bracket 310 covers the outer surface of the inserted inflator body 320.

The clamp 330 clamps the inflator body 320 to the inflator bracket 310. The clamp 330 is configured as a fastening member such as a bolt or screw.

The roof airbag apparatus 1 in accordance with the embodiment of the present disclosure further includes a roller part 400. The roller part 400 is disposed at an end (right end in FIG. 3) of the cushion part 200, and rotated by contact with the cushion part 200 which is inflated by the gas discharged from the inflator part 300. The roller part 400 is disposed under the end of the cushion part 200 (based on FIG. 3), and guides the inflation of the cushion part 200 while rotated by the contact with the inflated cushion part 200.

Referring to FIGS. 6 and 7, a roof airbag apparatus 1 in accordance with another embodiment of the present disclosure is mounted in a sunshine roof part 20 formed at each of the front and rear of a vehicle 10.

In the roof airbag apparatus 1, a deployment guide part 100 is formed in the longitudinal direction of the vehicle 10, and guides the deployment of a cushion part 200 while coming into contact with both ends of the cushion part 200. The cushion part 200 is deployed in the longitudinal direction of the deployment guide part 100 toward the front of the vehicle 10.

According to the number of the sunshine roof parts 20 formed in the longitudinal direction of the vehicle 10, the plurality of deployment guide parts 100 are mounted. That is, the plurality of deployment guide parts 100 are mounted according to the number of the sunshine roof parts 20 which are formed to correspond to an arrangement of seats disposed in the vehicle 10 from the front to the rear of the vehicle 10. The cushion part 200 and the inflator part 300 are mounted along the deployment guide part 100.

In the airbag apparatus 1 in accordance with the embodiment of the present disclosure, the deployment guide part 100 has a length set according to the length of the sunshine roof part 20. When the sunshine roof parts 20 are formed at the front and rear of the roof of the vehicle 10 as illustrated in FIG. 6, respectively, the lengths of the deployment guide parts 100 are set according to the lengths of the front and rear sunshine roof parts 20.

The roof airbag apparatus in accordance with the embodiment of the present disclosure can be applied to various sunshine roofs other than the panorama sunshine roof.

Furthermore, the roof airbag apparatus in accordance with the embodiment of the present disclosure can be reduced in size to not only minimize interference with surrounding other parts, but also minimize a change in layout of the roof of an existing vehicle, thereby improving the productivity.

Furthermore, the size of the cushion part can be reduced to improve the deployment speed of the airbag apparatus, which makes it possible to effectively protect a passenger.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A roof airbag apparatus comprising:
   a deployment guide part mounted on a sunshine roof part of a vehicle, wherein the deployment guide part is formed in a longitudinal direction of the vehicle, and guides a deployment of the cushion part while coming into contact with both ends of the cushion part;
   a cushion part mounted in the sunshine roof part, and deployed in a longitudinal direction of the deployment guide part, wherein the cushion part is fixed to a module bracket part fixed to one side of the sunshine roof part, the one side of the sunshine roof part corresponding to an opposite direction of a deployment direction of the cushion part; and
   an inflator part mounted in the cushion part, and configured to discharge gas to the cushion part in case of a collision of the vehicle.

2. The roof airbag apparatus of claim 1, wherein the inflator part comprises:
   an inflator body mounted in the cushion part, and configured to discharge gas to the cushion part;
   an inflator bracket having one open side, and configured to cover an end of the inflator body; and
   a clamp configured to close the open side of the inflator bracket, and clamp the inflator body to the inflator bracket.

3. The roof airbag apparatus of claim 1, wherein the deployment guide part has a length set according to a length of the sunshine roof part.

4. The roof airbag apparatus of claim 1, further comprising a roller part disposed at an end of the cushion part, and rotated by contact with the cushion part which is inflated by gas discharged from the inflator part.

5. The roof airbag apparatus of claim 1, wherein the cushion part is folded in a zigzag shape and connected to the inflator part, before deployed.

6. The roof airbag apparatus of claim 1, wherein the deployment guide part is mounted according to a number of sunshine roof parts formed in a longitudinal direction of the vehicle.

* * * * *